US012321341B2

(12) United States Patent
Wille et al.

(10) Patent No.: US 12,321,341 B2
(45) Date of Patent: Jun. 3, 2025

(54) HYBRID SEARCH-AND-BROWSE INTERFACE

(71) Applicant: Ancestry.com Operations Inc., Lehi, UT (US)

(72) Inventors: Robert Baird Wille, Saratoga Springs, UT (US); Christopher Todd Brewer, Orem, UT (US); Blake Matthew Scarbrough, Saratoga Springs, UT (US); Justin Blake Christensen, Riverton, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 0 days.

(21) Appl. No.: 18/341,631

(22) Filed: Jun. 26, 2023

(65) Prior Publication Data

US 2023/0418813 A1    Dec. 28, 2023

Related U.S. Application Data

(60) Provisional application No. 63/355,709, filed on Jun. 27, 2022.

(51) Int. Cl.
*G06F 16/242*    (2019.01)
*G06F 16/22*    (2019.01)
*G06F 16/28*    (2019.01)

(52) U.S. Cl.
CPC ...... *G06F 16/2428* (2019.01); *G06F 16/2246* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 6,366,910 B1* | 4/2002 | Rajaraman | G06F 16/285 707/999.005 |
| 8,850,362 B1* | 9/2014 | Khoshnevisan | G06F 16/951 715/853 |
| 11,899,700 B1* | 2/2024 | Yoon | G06F 16/288 |
| 2014/0223381 A1* | 8/2014 | Huang | G06F 3/04842 715/863 |
| 2020/0242174 A1* | 7/2020 | Biran | G06F 16/953 |

* cited by examiner

*Primary Examiner* — Neveen Abel Jalil
*Assistant Examiner* — John J Morris
(74) *Attorney, Agent, or Firm* — Keller Preece PLLC

(57) ABSTRACT

The present disclosure is directed toward systems, methods, and non-transitory computer-readable media for generating and providing a hybrid search-and-browse interface for accurately and efficiently locating and presenting targeted genealogical content items. For example, the disclosed systems generate and provide a multi-layered navigational structure using browse trees that represent categories of genealogical content items, where each successive browse tree in the hybrid search-and-browse interface narrows the search results from the one before based on some (selected) criteria. In some cases, to support a hybrid search-and-browse interface, the hybrid search-and-browse system generates and maintains a facet index for genealogical content items stored in a database as a basis for generating and providing browse trees for navigating through search results of content items.

20 Claims, 12 Drawing Sheets

Home   Search   Browse   War Stories   Memorials   Admin   Help

Filter ▽ | ⦿ Ohio, USA | People, places, records, dates... 🔍 | View Results in Browse (Add Date)  (Add Place)                                404                      ▽ Any Time

Title Collection

☐ USA — 550M+
☐ U.K. — 721M+
☐ Germany — 6.4M+
    See All

👤 "Jon" Jonathan Edward Hampton
    by JohannaHampton70
    (Person)
    Death: 31 Jan 2000
    Birth: 17 May 1980

📄 Connor Cornelius
    Civil War Pension Index
    (Image)
    Date: 29 Jun 1865
    Arm of Service: Army
    Company/Region: B,14

Conflict/War

☐ World War I — 4.4M+
☐ World War II — 2M+
☐ US Civil War — 2M+
    See All

👤 Mary Elizabeth Boyer
    WWII – By Kim101
    (Service Person)
    Death: 22 Nov 2000 (Youngstown OH)
    Birth: 29 Mar 1908 (Johnston PA)
    World War II: Army Captain - USA

Title Collection

☐ Non Military — 13M+
☐ World War II - USA — 4.7M+
☐ World War I - USA — 2.8M+
    See All 📄 E Olli
    WWII Enlistment Records
    (Index Record)
    Enlistment: 15 Mar 1941
    Birth: 1900

*Fig. 4*

Home  Search  Browse  War Stories  Memorials  Admin  Help

[Filter ▽]  [📍 Ohio, USA]  People, places, records, dates... 🔍                    View Results in Search — 508

— 504

[Add Date]  [Add Place]

Place
☐ USA                550M+
☐ U.K.               721M+
☐ Germany            6.4M+
    See All

Conflict/War
☐ World War I        4.4M+
☐ World War II       2M+
☐ US Civil War       2M+
    See All

Title Collection
☐ Non Military       13M+
☐ World War II - USA  4.7M+
☐ World War I - USA   2.8M+
    See All

Publications - 197

[Filter Publications]

Army Register of Enlistments          (1)
(1798 – 1914)
Australia WWI Service Records        (15)
Australia WWII Service Records       (18)
Australian Imperial Force – WWII      (1)
Boston Library Collections           (12)
Bounty-Land Warrants                 (9K+)
Brady Civil War Photos                (1)
British Army WWI Pension             (219)
Records
British Army WWI Service             (665)
Records
Canada, British Regimental           (49)
Records
                See All

Home  Search  Browse  War Stories  Memorials  Admin  Help

Filter ▽ | Conflict/War: US Civil War | Army |  🔍  View Results in Search

Add Date   Add P[lace]

Place

☐ USA
☐ U.K.
☐ Germany
  See All

| | |
|---|---|
| Civil War Medal | Award |
| Army Medal of Honor (1945 – 2000) | Award |
| Philippine Campaign Medal | Award |
| Army | Branch (1) |
| Union Army | Branch (15) |
| Confederate Army | Branch (18) |
| US Army | Branch (1) |
| See All | |

Conflict/War

☐ World War I          2M+
☐ World War II         2M+
☐ US Civil War
  See All

Title Collection

☐ Non Military          13M+
☐ World War II - USA    4.7M+
☐ World War I - USA     2.8M+
  See All Bounty-Land Warrants                        (12)
Brady Civil War Photos                      (9K+)
British Army WWI Pension Records            (219)
British Army WWI Service Records            (665)
Canada, British Regimental Records          (49)
                    See All

Home  Search  Browse  War Stories  Memorials  Admin  Help

Filter ▽  | Conflict/War: US Civil War |  | Branch: Army |

( Add Date )  ( Add Place ) — 804, 806

Place
- ☐ USA — 550M+
- ☐ U.K. — 721M+
- ☐ Germany — 6.4M+
- See All

Conflict/War
- ☐ World War I — 4.4M+
- ☐ World War II — 2M+
- ☐ US Civil War — 2M+
- See All

Title Collection
- ☐ Non Military — 13M+
- ☐ World War II - USA — 4.7M+
- ☐ World War I - USA — 2.8M+
- See All

Publications - 7

| Filter Publications ▽ |

Medal of Honor Recipients, 1863 – 2012 ................ (1k+)
Pension Numerical Index ................ (5.2M+)
US War anf Conflict Images ................ (1)
Unit History – Illinois Volunteer Regiments ................ (54)
Unit History – New Hampshire Volunteer Regiments ................ (6k+)
Unit History – Vermont Volunteer Regiments ................ (264)
Veterans Affairs BIRLS Death File ................ (10)

( View Results in Search )

800
802
808

HYBRID SEARCH-AND-BROWSE INTERFACE

CROSS REFERENCE TO RELATED APPLICATIONS

This application claims the benefit of and priority to U.S. Provisional Patent Application No. 63/355,709, filed Jun. 27, 2022, entitled HYBRID SEARCH AND BROWSE INTERFACE, which is incorporated herein by reference in its entirety.

FIELD

The disclosed embodiments relate to systems, methods, and/or computer-program products configured for facilitating and/or providing a hybrid and/or combined search-and-browse interface, particularly regarding searching and browsing historical or other records in a database.

BACKGROUND

Many existing genealogical research systems provide repositories of information stored in databases and are configured to allow connected devices to search for information stored within the repositories. However, given the scale of genealogical databases, which may include tens of billions of distinct historical records, successfully surfacing a particular genealogical content item without requiring onerous input from the client device is a technologically complicated task, especially given the limited screen space of computing devices. This is particularly true for incomplete search queries and for searches that produce large numbers of genealogical content items that contain similar or duplicative information. Consequently, many existing systems exhibit a number of deficiencies or drawbacks, particularly regarding accuracy, navigational efficiency, and computational efficiency.

As just suggested, some existing genealogical research systems inaccurately surface genealogical content items. To elaborate, many existing systems rely exclusively on conventional search queries for identifying and surfacing relevant genealogical content items. However, given the enormity of the data analyzed for each search request, existing systems often struggle to correctly prioritize and surface targeted (e.g., desired) content items. For instance, depending on the search query, existing systems can identify thousands or millions of corresponding genealogical content items, where desired target items may be buried many layers or pages deep within the search results. Consequently, even if a prior system correctly identifies the targeted content item, prioritizing and surfacing the targeted content item at the top of the search results is difficult (if not impossible) for the prior system based solely on a search query.

Due at least in part to their inaccuracies, existing genealogical research systems can further suffer from navigational inefficiencies. For example, while many existing systems provide search tools for identifying genealogical content items, existing search tools often require excessive user interactions with a client device to sift through an untenably large number (e.g., hundreds or thousands) of search results to locate a targeted content item. As another example, some existing systems provide browse tools for browsing through genealogical content items. But without prior determination of metadata and/or a file path to locate a targeted content item, conventional browse tools require very large numbers of client device interactions and navigational operations to locate the targeted content item. Indeed, conventional user interfaces and navigational tools of existing systems are navigationally inefficient, requiring excessive client device interactions and navigational operations to locate desired data or functionality.

In addition to navigational inefficiencies, some existing genealogical research systems suffer from computational inefficiencies as well. More specifically, some existing systems utilize and maintain databases defined or organized using inefficient data structures that require significant computational resources (e.g., processing power and memory) to update when adding or changing stored genealogical content items. For instance, upon detecting a new content item to add to a database (or upon detecting a change to an existing content item), some existing systems require regenerating the database structure from scratch to rebuild a hierarchical tree of parent nodes and child nodes rearranging the (billions of) content items to add a new node for the new content item in the correct placement within the hierarchy. Depending on the size of the database, the process of rebuilding the node structure can take days or weeks, consuming excessive resources that could otherwise be preserved with a more efficient data organization paradigm.

SUMMARY

This disclosure describes one or more embodiments of systems, methods, and non-transitory computer-readable storage media that provide benefits and/or solve one or more of the foregoing and other problems in the art. In particular, the disclosed systems generate and provide a hybrid search-and-browse interface for accurately and efficiently locating and presenting targeted genealogical content items. For example, the disclosed systems generate and provide a multi-layered navigational structure using browse trees that represent categories of genealogical content items, where each successive browse tree in the hybrid search-and-browse interface narrows the search results from the one before based on some (selected) criteria. In some cases, to support a hybrid search-and-browse interface, the hybrid search-and-browse system generates and maintains a facet index for genealogical content items stored in a database as a basis for generating and providing browse trees for navigating through search results of content items.

BRIEF DESCRIPTION OF THE DRAWINGS

The detailed description refers to the drawings briefly described below.

FIG. 4 illustrates an example search mode for a hybrid search-and-browse interface in accordance with one or more embodiments.

FIG. 5 illustrates an example browse mode for a hybrid search-and-browse interface in accordance with one or more embodiments.

FIG. 7 illustrates an example hybrid search-and-browse interface including a search element menu in accordance with one or more embodiments.

FIG. 8 illustrates an example hybrid search-and-browse interface for multiple search blocks in accordance with one or more embodiments.

DETAILED DESCRIPTION

Figure 1:
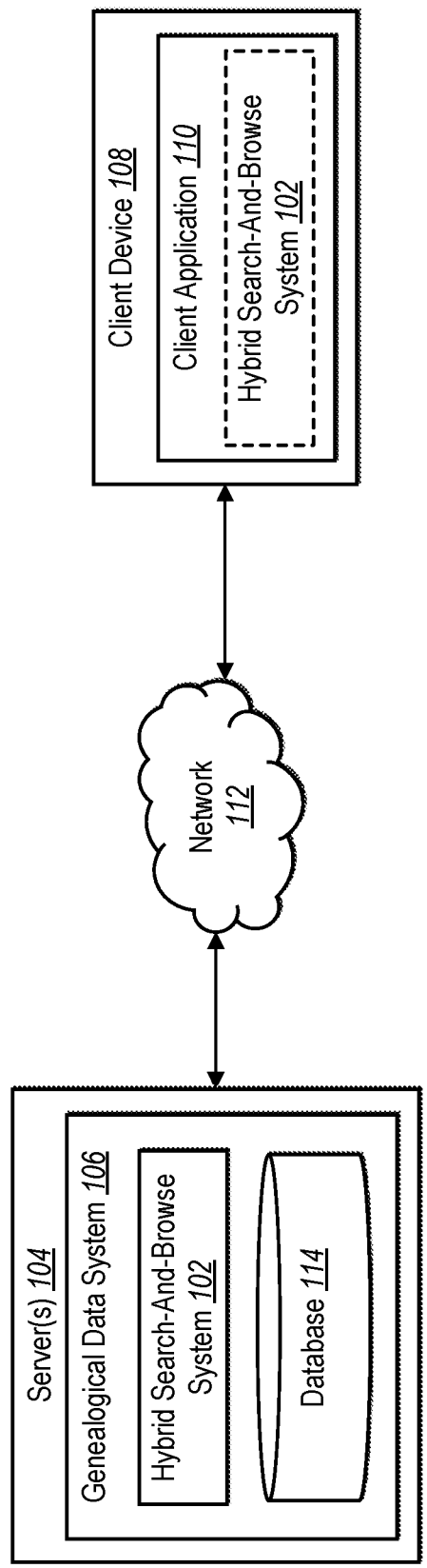
FIG. 1 illustrates a block diagram of a system environment including a hybrid search-and-browse system in accordance with one or more embodiments.

This disclosure describes one or more embodiments of a hybrid search-and-browse system that can generate and provide a hybrid search-and-browse interface that intelligently combines search functions and browse functions for accurate, efficient location and access of target content items. In many use cases, user accounts of genealogical content systems use client devices to search genealogical databases for genealogical content items (e.g., digitized newspaper articles, images, census records, obituaries, court documents, military records, immigration records, and other types of digitized historical documents) to identify family members to link within genealogical trees stored within one or more genealogical tree databases and/or to add genealogical content items to existing nodes within genealogical trees. As part of this process, the hybrid search-and-browse system can provide a hybrid search-and-browse interface that includes interface elements for searching and browsing in a hierarchical, nested fashion according to data facets extracted from stored (genealogical) content items.

To facilitate identifying and providing targeted/relevant genealogical content items, the hybrid search-and-browse system can generate and maintain a genealogical database that stores a repository of genealogical content items. More specifically, the hybrid search-and-browse system can utilize a genealogical database that contains or stores billions of genealogical content items that are searchable and displayable on a client device. For searching the database, the hybrid search-and-browse system can further extract data facets (e.g., metadata defining one or more attributes or parameters of the genealogical content items) from the content items and can index the (billions of content items within the) database according to the extracted data facets. Accordingly, in response to detecting a new content item to add to the database (or detecting a change to an existing content item), the hybrid search-and-browse system can extract data facets from the (new) content item and can add the data facets to a data facet index containing data facets for the database. Thus, in response to a search query, the hybrid search-and-browse system can access the index to identify (categories or types of) content items that correspond to the search query based on the extracted data facets.

As just suggested, the hybrid search-and-browse system can generate and provide genealogical content items in response to a search query. Indeed, the hybrid search-and-browse system can provide a hybrid search-and-browse interface that includes a search element for entering search queries to search the content item database. Thus, in response to receiving a user query entered via a search element on a client device, the hybrid search-and-browse system can generate or identify one or more categories or types of content items corresponding to the search query (or corresponding to a data facet defined by the search query).

For instance, the hybrid search-and-browse system searches an index of data facets to generate a facet tree (or a search tree) that includes a set of nodes (representing content items and/or categories of content items) corresponding to the search query (or a data facet defined by the search query). Specifically, the hybrid search-and-browse system can generate a facet tree to include parent nodes and child nodes, where a parent node represents a category of content items that share at least one data facet (e.g., a facet that defines the node/category), and where a child node represents either a sub-category of the parent category or an individual content item within the parent category (e.g., where the content item(s) represented by the child node shares the data facet of the parent node in addition to one or more other data facets). The hybrid search-and-browse system can thus generate a different facet tree (or search tree) for each search query by defining parent nodes and child nodes according to data facets of content items and of the search query.

As mentioned, the hybrid search-and-browse system can generate and provide search results within a hybrid search-and-browse interface. Specifically, the hybrid search-and-browse system can identify genealogical content items corresponding to (one or more data facets of) the search query and can further provide one or more browse trees within the hybrid search-and-browse interface to facilitate efficient navigation of the search results. For instance, the hybrid search-and-browse system generates a browse tree to include or depict categories of content items (or individual content items) that correspond to the search query. In some cases, the hybrid search-and-browse system generates a browse tree to represent a parent node (corresponding to a particular data facet for a search query) for a category of content items and to include a number of sub-categories of content items corresponding to child nodes (which correspond to additional data facets).

The sub-categories are further selectable to expand into additional browse trees within the hybrid search-and-browse interface. Indeed, based on a selection of a category element within a browse tree, the hybrid search-and-browse system generates and provides an additional browse tree as a sub-tree of the initial browse tree, such that content items and/or categories within the additional browse tree comprise a subset or a narrowing of the content items and/or categories within the initial browse tree. In some embodiments, the hybrid search-and-browse system provides successive browse trees (corresponding to selections of categories) for display adjacent to one another such that each successive browse tree is narrower than the one before, progressively honing in on selected categories. Additional detail regarding the hybrid search-and-browse interface is provided below with reference to the figures.

As suggested above, the hybrid search-and-browse system can provide improvements or advantages over existing historical content systems. For example, the hybrid search-and-browse system can improve accuracy over prior systems in prioritizing and surfacing query results that include genealogical content items matching a record query. Indeed, while some prior systems inaccurately prioritize or surface query results that may include relevant/targeted genealogical content items buried under many (e.g., millions of) irrelevant content items, the hybrid search-and-browse system utilizes a more sophisticated hybrid search-and-browse technique based on facet indexes to accurately surface targeted content items. For instance, by indexing genealogical content items according to data facets and by providing browse trees that provide contextual guidance for narrowing onto desired search results, the hybrid search-and-browse system surfaces targeted content items more accurately and more quickly than prior systems.

Due at least in part to its improved accuracy, the hybrid search-and-browse system can further generate and provide more efficient user interfaces. For instance, whereas prior systems provide exclusively search-based or browse-based interfaces that require excessive numbers of client device interactions to locate targeted genealogical content items, the hybrid search-and-browse system provides a hybrid search-and-browse interface that more efficiently surfaces targeted content items. Indeed, the hybrid search-and-browse interface includes browse trees based on facet indexes to intelligently locate content items using fewer client device interactions and navigational operations than prior systems.

To illustrate the improvements of a hybrid search-and-browse interface, in most conventional browse applications of prior systems that involve a hierarchical tree, it is impossible to filter the tree beyond conventionally filtering by child values of a specific node in the tree. With the hybrid search-and-browse interface, by contrast, it is possible to apply a global filter that produces a pruned tree (e.g., using the facets and other techniques described herein). Generating such a pruned tree narrows the possible facet values in all levels of the tree, thereby providing a more efficient, targeted interface that prunes out irrelevant content. In addition to filtering all levels of the tree for more efficient searching for specific records, the hybrid search-and-browse interface more efficiently presents specific values as well (e.g., what cavalry units were in Louisiana in the US Civil War) as a result of pruning the tree in this fashion, significantly reducing the number of client interactions compared to prior systems. Depending on the use case, the hybrid search-and-browse interface can be intractable without a global filter.

In some embodiments, the hybrid search-and-browse system further improves computational efficiency over prior systems. For example, as opposed to prior systems that regenerate or restructure databases entirely from the ground up based on detecting new (or changes to) content items, the hybrid search-and-browse system maintains and updates a data facet index for a genealogical content item database. Using the data facet index, the hybrid search-and-browse system can preserve computing resources, such as computing power and memory, in updating a search database for identifying targeted content items. The efficiency gains are especially pronounced in systems with databases storing large numbers (e.g., billions) of genealogical content items (e.g., reducing the update process by several orders of magnitude, from days to minutes).

As illustrated by the foregoing discussion, the present disclosure utilizes a variety of terms to describe features and benefits of the hybrid search-and-browse system. Additional detail is hereafter provided regarding the meaning of these terms as used in this disclosure. Further, while this disclosure focuses primarily on genealogical content, the hybrid search-and-browse system can perform one or more of the processes described herein to provide a hybrid search-and-browse interface in the context of other types of digital content items as well. As used herein, the term "genealogical content item" (or simply "content item") refers to a digital object or a digital file that includes information (e.g., genealogical information) interpretable by a computing device (e.g., a client device) to present information to a user. A genealogical content item can include a file such as a digital text file, a digital image file, a digital audio file, a webpage, a website, a digital video file, a web file, a link, a digital document file, or some other type of file or digital object. A genealogical content item can have a particular file type or file format, which may differ for different types of digital content items (e.g., digital documents, digital images, digital videos, or digital audio files). In some cases, a genealogical content item can refer to a content item that includes or depicts historical or genealogical information, such as a digitized newspaper article, a digitized photograph of a relative, a digitized census record, a digitized obituary, a digitized court document, a digitized DNA analysis, a digitized military record, a digitized immigration record, or a digitized family tree. In some embodiments, a genealogical content item includes a content item selected or identified to recommend to a user account, such as a record hint (e.g., a stored genealogical content item), a digital story (e.g., a stored collection of genealogical content items arranged for a particular person, topic, or entity of a genealogical data system), a digital image (e.g., a digitized photograph), a new person hint (e.g., a node to add to a genealogical tree), a member tree hint (e.g., a prediction for correcting a node within a genealogical tree of a user account), or a DNA match (e.g., a record indicating a DNA match of a user account to a relative whose information is stored in a genealogical data system).

In some embodiments, a genealogical content item can include or be defined by one or more data facets. As used herein, the term "data facet" (or simply "facet") refers to a data object or metadata object that is trackable, indexable, and that defines classifications or parameters associated with a content item. For example, a data facet can include computer code defining an observable or unobservable attribute associated with a content item. Data facets facilitate faceted searching for accessing content items through multiple dimensions and facet trees, rather than through a single, pre-determined taxonomic order. Relatedly, as used herein, the term "stacked data facet" refers to a data facet that defines a category of content items stacked or layered within another category of content items defined by a different data facet. Indeed, the hybrid search-and-browse system can generate a "facet tree" that hierarchically arranges content items into nodes defined by data facets, where child nodes inherit the facets of parent nodes and define further detail with additional facets. In some cases, the hybrid search-and-browse system generates a new facet tree for each new search query, where a broadest node of search results is defined by at least one data facet corresponding to the query.

As mentioned, in some embodiments, the hybrid search-and-browse system generates and provides a browse tree. As used herein, the term "browse tree" refers to an organization of content items or content item categories that share at least one data facet and that is navigable to access additional browse trees corresponding to different data facets. In some cases, a browse tree includes a user interface element or a collection of interface elements that visually portray or depict content items or content item categories within a particular node of a facet tree. Additionally, a browse tree can include selectable interface elements for drilling down into additional browse trees corresponding to additional (child) nodes within the facet tree.

Additional detail regarding the hybrid search-and-browse system will now be provided with reference to the figures. For example, FIG. 1 illustrates a schematic diagram of an example system environment for implementing a hybrid search-and-browse system 102 in accordance with one or more implementations. An overview of the hybrid search-and-browse system 102 is described in relation to FIG. 1. Thereafter, a more detailed description of the components and processes of the hybrid search-and-browse system 102 is provided in relation to the subsequent figures.

As shown, the environment includes server(s) 104, a client device 108, a database 114, and a network 112. Each of the components of the environment can communicate via the network 112, and the network 112 may be any suitable network over which computing devices can communicate. Example networks are discussed in more detail below in relation to FIGS. 11-12.

As mentioned above, the example environment includes a client device 108. The client device 108 can be one of a variety of computing devices, including a smartphone, a tablet, a smart television, a desktop computer, a laptop computer, a virtual reality device, an augmented reality device, or another computing device as described in relation to FIGS. 11-12. The client device 108 can communicate with the server(s) 104 and/or the database 114 via the network 112. For example, the client device 108 can receive user input from respective users interacting with the client device 108 (e.g., via the client application 110) to, for instance, search for, access, generate, modify, or share a genealogical content item and/or to interact with a genealogy tree or a content item via a graphical user interface of the genealogical data system 106. In addition, the hybrid search-and-browse system 102 on the server(s) 104 can receive information relating to various searches for, or interactions with, genealogical content items, and/or user interface elements based on the input received by the client device 108.

As shown, the client device 108 can include a client application 110. In particular, the client application 110 may be a web application, a native application installed on the client device 108 (e.g., a mobile application, a desktop application, etc.), or a cloud-based application where all or part of the functionality is performed by the server(s) 104. Based on instructions from the client application 110, the client device 108 can present or display information, including a user interface such as a hybrid search-and-browse interface, genealogy tree interface, a discover interface for additional genealogical content, or some other graphical user interface, as described herein.

As illustrated in FIG. 1, the example environment also includes the server(s) 104. The server(s) 104 may generate, track, store, process, receive, and transmit electronic data, such as genealogical content items, search queries, browse tree interactions, search results, and/or interactions with content items. For example, the server(s) 104 may receive data from the client device 108 in the form of a search query. In addition, the server(s) 104 can transmit data to the client device 108 in the form of a browse tree including content items or categories of content items within a hybrid search-and-browse interface. Indeed, the server(s) 104 can communicate with the client device 108 to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and other types of servers.

As shown in FIG. 1, the server(s) 104 can also include the hybrid search-and-browse system 102 as part of a genealogical data system 106. The genealogical data system 106 can communicate with the client device 108 to perform various functions associated with the client application 110 such as managing user accounts, managing genealogical data, managing genealogy trees, managing genealogical content items, and facilitating user interaction with, and sharing of, the genealogy trees and/or genealogical content items. Indeed, the genealogical data system 106 can include a network-based cloud storage system to manage, store, and maintain genealogical content items and genealogy trees related data user accounts. For instance, the genealogical data system 106 can utilize genealogical data across various content items and user accounts to generate and maintain a universal genealogy tree that reflects the relatedness or consanguinity between nodes corresponding to all user accounts and other individuals indicated by stored genealogical content items (e.g., within the database 114). In some embodiments, the hybrid search-and-browse system 102 and/or the genealogical data system 106 utilize the database 114 to store and access information such as genealogical content items, genealogy trees, user account data, and/or other information.

As further illustrated in FIG. 1, the hybrid search-and-browse system 102 includes a database 114 that stores genealogical content items. In particular, the hybrid search-and-browse system 102 stores genealogical content items and searches the genealogical content items to generate search results and browse trees. For instance, the hybrid search-and-browse system 102 receives a search query from the client device 108 and generates a browse tree that includes categories of content items defined by one or more data facets for drilling down into additional browse trees according to narrower data facets.

Although FIG. 1 depicts the hybrid search-and-browse system 102 located on the server(s) 104, in some implementations, the hybrid search-and-browse system 102 may be implemented by (e.g., located entirely or in part on) one or more other components of the environment. For example, the hybrid search-and-browse system 102 may be implemented in whole or in part by the client device 108. For example, the client device 108 and/or a third-party system can download all or part of the hybrid search-and-browse system 102 for implementation independent of, or together with, the server(s) 104.

In some implementations, though not illustrated in FIG. 1, the environment may have a different arrangement of components and/or may have a different number or set of components altogether. For example, the client device 108 may communicate directly with the hybrid search-and-browse system 102, bypassing the network 112. As another example, the environment may include multiple client devices, each associated with a different user account. In addition, the environment can include the database 114 located external to the server(s) 104 (e.g., in communication via the network 112) or located on the server(s) 104 and/or on the client device 108.

Figure 2:
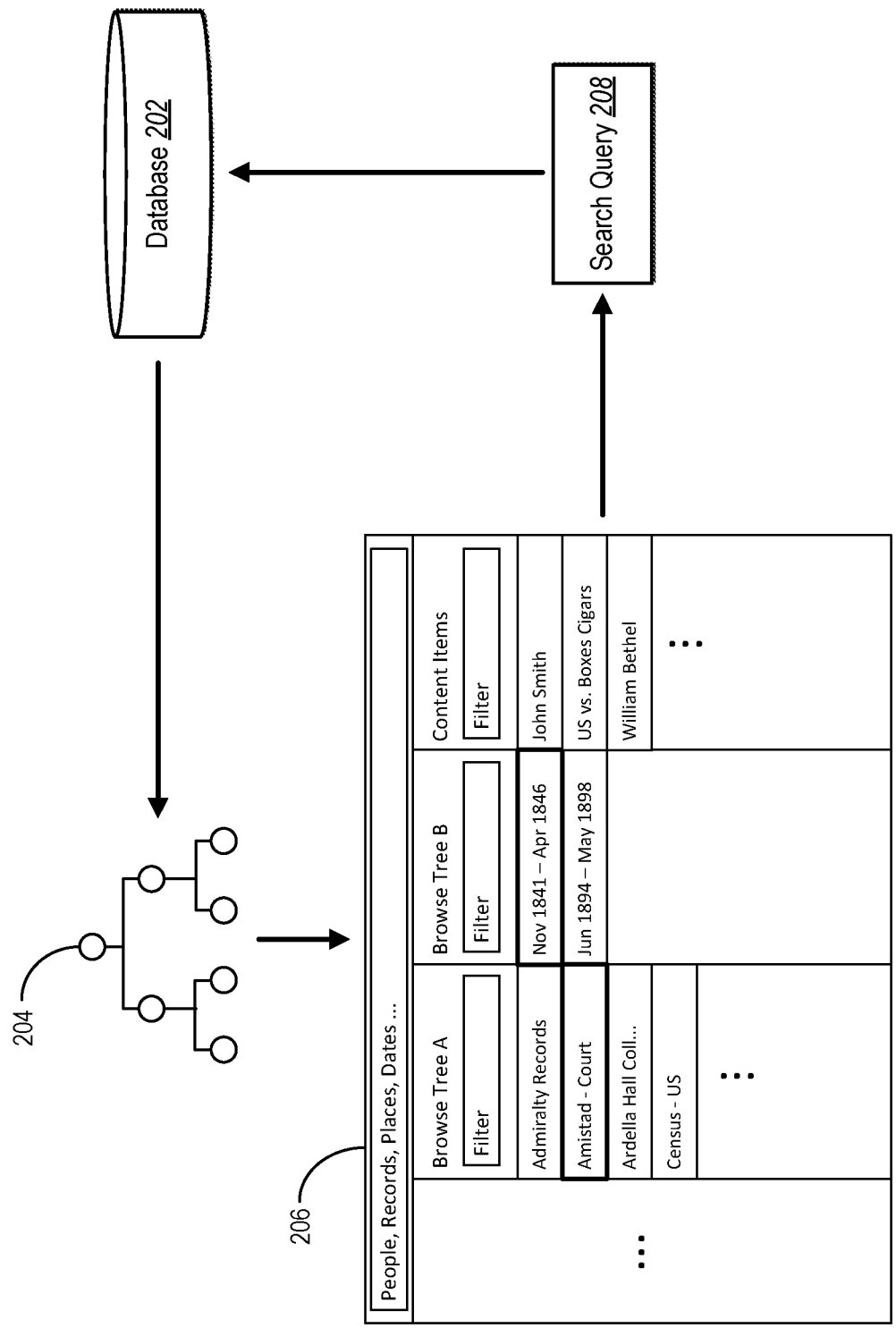
FIG. 2 illustrates an overview of generating and providing a hybrid search-and-browse interface in accordance with one or more embodiments.

As mentioned above, the hybrid search-and-browse system 102 can generate and provide a hybrid search-and-browse interface. In particular, the hybrid search-and-browse system 102 generates a hybrid search-and-browse interface that includes browse trees based on data facets for accurately and efficiently drilling down to locate targeted genealogical content items. FIG. 2 illustrates an overview of generating and providing a hybrid search-and-browse interface in accordance with one or more embodiments. Additional detail regarding the acts and methods described in FIG. 2 is provided thereafter with reference to subsequent figures.

As illustrated in FIG. 2, the hybrid search-and-browse system 102 accesses a database 202 (e.g., the database 114). More specifically, the hybrid search-and-browse system 102 accesses a database that contains or stores genealogical content items. The hybrid search-and-browse system 102 further indexes the (content items stored within the) database 202 by extracting data facets from the content items and adding the extracted facets to a facet index. Accordingly, based on search queries, the hybrid search-and-browse system 102 can generate facet trees that include nodes defining content items and/or content item categories based on hierarchical relationships between data facets.

To elaborate, as illustrated in FIG. 2, the hybrid search-and-browse system 102 receives a search query 208 from a client device. More particularly, the hybrid search-and-browse system 102 receives the search query 208 in the form of text input entered via a search element of a hybrid search-and-browse interface 206. In response to the search query 208, the hybrid search-and-browse system 102 extracts or determines one or more data facets corresponding to (or defined by the search query 208). The hybrid search-and-browse system 102 further compares the extracted query-based data facet(s) with data facets of a facet index representing genealogical content items stored within the database 202. Accordingly, the hybrid search-and-browse system 102 identifies one or more (categories of) content items that correspond to the search query 208.

As further illustrated in FIG. 2, the hybrid search-and-browse system 102 generates a facet tree 204 specific to the search query 208. Specifically, the hybrid search-and-browse system 102 generates the facet tree 204 to include a plurality of nodes (including parent nodes and child nodes), where each node represents either an individual content item or a category of content items associated with a particular data facet—e.g., such that each node also represents a (shared) data facet. Thus, in response to receiving the search query 208, the hybrid search-and-browse system 102 identifies a specific data facet in the facet index that defines a broadest or largest set of content items that correspond to (the facet extracted from) the search query and selects the facet as a root node for the facet tree 204 (e.g., the top node). Additionally, the hybrid search-and-browse system 102 defines child nodes (and grandchild nodes and so forth) within the facet tree 204 by identifying data facets that represent (categories or types of) content items, where each narrower node inherits the facets of broader nodes above it.

From the facet tree 204, the hybrid search-and-browse system 102 further generates and provides a browse tree within the hybrid search-and-browse interface 206. More particularly, the hybrid search-and-browse system 102 generate a first browse tree (e.g., "Browse Tree A") to represent the root node of the facet tree 204. In addition, based on receiving an indication of a user interaction selecting an interface element within the first browse tree, the hybrid search-and-browse system 102 generates a second browse tree (e.g., "Browse Tree B") to represent a node of the facet tree 204 corresponding to the selected interface element (e.g., "Amistad—Court"). The hybrid search-and-browse system 102 can further generate a third browse tree (e.g., "Content Items") to represent an additional node corresponding to a selected interface element (e.g., "November 1841-April 1846) within the second browse tree. As shown, the hybrid search-and-browse system 102 generates the hybrid search-and-browse interface 206 to include three browse trees, each successive browse tree narrowing on the one before it until the third browse tree depicts individual content items.

Figure 3:
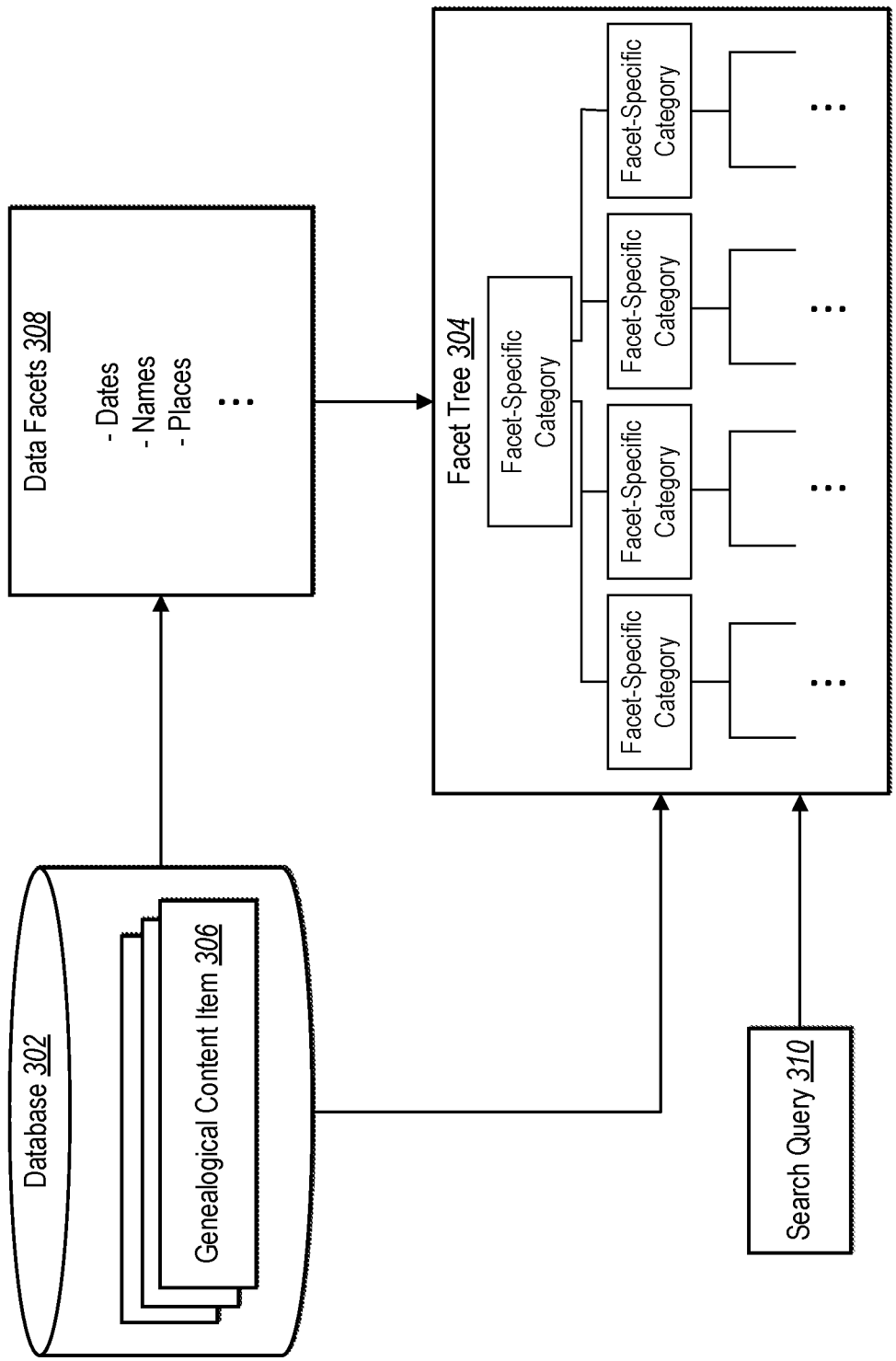
FIG. 3 illustrates an example diagram for managing an index of data facets for a database of genealogical content items in accordance with one or more embodiments.

As noted above, in certain embodiments, the hybrid search-and-browse system 102 generates and maintains facet trees specific to search queries. In particular, the hybrid search-and-browse system 102 generates facet trees based on a facet index for data facets extracted from content items stored within a database of the genealogical data system 106. FIG. 3 illustrates an example diagram for generating and managing facet trees as a basis for populating search results for search queries.

As illustrated in FIG. 3, the hybrid search-and-browse system 102 generates a facet tree 304 based on a search query 310. More specifically, the hybrid search-and-browse system 102 receives the search query 310 via text input within a search element of a hybrid search-and-browse interface. In response to the search query 310, the hybrid search-and-browse system 102 extracts or identifies a data facet for the search query 310 and uses the extracted data facet as a basis for analyzing a database 302 to identify genealogical content items 306 corresponding to the search query 310.

To elaborate, in response to the search query 310, the hybrid search-and-browse system 102 analyzes a facet index that includes data facets 308 extracted from the genealogical content item 306 and other genealogical content items stored within the database 302. In some cases, the data facets 308 include dates, names, places, record types, relationship information, immigration information, military information, occupation information, education information, birth information, marriage information, death information, and/or other information contained within genealogic content items. From the index of the data facets 308, the hybrid search-and-browse system 102 identifies a broadest category of content items stored in the database 302 that correspond to the search query 310 (or a category that includes at least a threshold number of sub-categories or content items).

For instance, the hybrid search-and-browse system 102 identifies a set of content items that share a common data facet and generates a root node of the facet tree 304 to represent the set of content items. The hybrid search-and-browse system 102 further fills in or completes the facet tree 304 by generating additional nodes that stem from the root node (and from child nodes of the root node). Each child node of the root node shares the common data facet of the root node as well as at least one additional data facet represented by the respective node. Thus, the hybrid search-and-browse system 102 customizes a search-specific facet tree (e.g., the facet tree 304) for the search query 310.

In some embodiments, to facilitate generating the facet tree 304 efficiently based on the data facets 308, the hybrid search-and-browse system 102 implements or utilizes a hash-based approach to create and sort clusters of content items stored within the database 302. Indeed, the hybrid search-and-browse system 102 greatly reduces the computing resources required to generate keys in a facet index. Unlike prior systems, the hybrid search-and-browse system 102 need not build new trees for new or modified content items. Rather, the hybrid search-and-browse system 102 performs an index update for new, removed, or changed content items (as opposed to altering all of the records in the publication), requiring milliseconds to generate. Even in situations for multi-image records (e.g., content items containing multiple pages), the hybrid search-and-browse system 102 can treat and update only images in the multi-image record, rather than sibling images and other related content items as required by prior systems.

An exemplary set of content items may include metadata as shown in Table 1 below:

TABLE 1

| Image ID | Given Name | Surname | State | Regiment | Rank | Page |
|---|---|---|---|---|---|---|
| 0001 | John | Smith | New York | 5th Infantry | Captain | 1 |
| 0002 | James | Smith | New York | 5th Infantry | Private | 1 |
| 0003 | John | Smith | New York | 5th Infantry | Captain | 2 |
| 0004 | John | Smith | New York | 5th Infantry | Private | 1 |
| 0005 | Harry | Potter | New Jersey | 1st Cavalry | Corporal | 1 |
| 0006 | Fred | Weasley | New Jersey | 8th Battery | Major | 1 |

The hybrid search-and-browse system 102 can discretize the metadata in Table 1, according to certain methodologies, as shown below:

```
New Jersey
    1st Cavalry
        Potter
            Harry Potter-0005
    8th Battery
        Weasley
            Fred Weasley-0006
New York
    5th Infantry
        Smith
            James Smith-0002
            John Smith-0001, 0003
            John Smith-0002
```

In some embodiments, the hybrid search-and-browse system 102 can discretize and organize the metadata in Table 1 by assigning cluster keys to content items. Particularly, the hybrid search-and-browse system 102 assigns cluster keys such that all images that have the same cluster key belong to the cluster (and are therefore part of the same content item or category of content items). In some cases, the hybrid search-and-browse system 102 generates a cluster key by hashing together uniquely identifying information about a content item or a subcomponent of a content item. In some cases, a content item (or subcomponent of a content item) includes no genuinely unique field (such as social security number), so the hybrid search-and-browse system 102 hashes at least a threshold amount of available information (e.g., metadata). Thus, in some cases, the hybrid search-and-browse system 102 groups or clusters distinct content items that have the same (or within a threshold similarity) hashes together into a shared content item. Content items with inconsistently keyed fields are sometimes split into multiple content items.

In the example above of Table 1 above, the hybrid search-and-browse system 102 can generate a cluster key in the form of hash(given name, surname, state, regiment, rank), where hash( . . . ) represents a hashing function. In some cases, the hybrid search-and-browse system 102 generates cluster keys to indicate a given name, a surname, a military rank, or other information based on the type of content item and the information within the content item. In these or other cases, the hybrid search-and-browse system 102 generates cluster keys with additional layers such as state and/or regiment. As shown, images 0001 and 0003 have the same values for each hashed field, so the hybrid search-and-browse system 102 will generate the same cluster key for images 0001 and 0003. However, because the fields differ for the other images, the hybrid search-and-browse system 102 will generate unique cluster keys for each of these images, respectively (e.g., 5 unique cluster keys for the example of Table 1).

To organize a genealogical content item for a browse structure (e.g., for a hybrid search-and-browse interface), the hybrid search-and-browse system 102 assigns every image within the content item its own cluster key. Indeed, the hybrid search-and-browse system 102 can do this for any image (or content item) in isolation. If an image is added to a content item (e.g., a publication), the hybrid search-and-browse system 102 can immediately compute its cluster key and assign the image to a corresponding cluster. If the metadata on an image is updated, the hybrid search-and-browse system 102 can determine and reassign a new cluster key.

In one or more embodiments, the hybrid search-and-browse system 102 configures a suitable cooperating database tool to group images (or other content items) into clusters by adding the images (or content items) and corresponding cluster keys into the database 302. The hybrid search-and-browse system 102 can further select content items to include in the facet tree 304 according to cluster keys. In certain embodiments, the hybrid search-and-browse system 102 uses ELASTICSEARCH, SOLR, OPENSEARCH, or some other search modality.

In one or more embodiments, to generate the facet tree 304, the hybrid search-and-browse system 102 organizes clusters into a hierarchy by generating values for each level in the hierarchy (e.g., for the arrangement of nodes in the facet tree 304, where each cluster corresponds to a respective node). Based on Table 1 above, the hybrid search-and-browse system 102 can determine a hierarchy for John Smith (Captain) having the order/hierarchy of: New York>$5^{th}$ Infantry>Smith, where each level is defined by a separate data facet. In some cases, the hybrid search-and-browse system 102 breaks data fields (e.g., dates) down into subcomponents to create distinct levels within the data field. In these or other cases, the hybrid search-and-browse system 102 can generate composite fields for clustering, such as browse fields that combine distinct company and regiment fields concatenated to a single browse field.

In some embodiments the hybrid search-and-browse system 102 adds the levels of a browse hierarchy to a facet index, such that browse trees correspond to the respective hierarchy levels/nodes/data facets (e.g., John Smith (Captain), browse tree 1=New York, browse tree 2=$5^{th}$ Infantry, browse tree 3=Smith). Accordingly, to obtain the values for the root node of the facet tree 304 (e.g., for the root data facet), the hybrid search-and-browse system 102 determines data facets for the levels of the facet tree 304.

In one or more implementations, the hybrid search-and-browse system 102 generates and utilizes sort keys for content items within the database 302. In some cases, a sort key may include a concatenation of data facets, e.g. for John Smith (Captain): New York/5$^{th}$ Infantry/Smith. For instance, the hybrid search-and-browse system 102 generates an image sort key based on a page field. In certain cases, the hybrid search-and-browse system 102 concatenates a cluster sort key and an image sort key to generate a key applicable or usable for sorting an entire publication. In some embodiments, the hybrid search-and-browse system 102 assigns page numbers for publications or content items that lack page numbers (or other field that can be used to sort within a cluster). Specifically, the hybrid search-and-browse system 102 tracks and assigns numbers based on a list of clusters to mitigate the problem of system-assigned page numbers within a publication being adversely affected by the addition or removal of an image/content item.

In some embodiments, the hybrid search-and-browse system 102 generates a hybrid search-and-browse interface where browse trees do not correspond directly to facets. For example, for a "John Smith from New York who fought in the 5$^{th}$ Infantry," the hybrid search-and-browse system 102 may not expose surnames as facets for conventional browsing on a specific surname but may instead use the surname to search within a browse tree hierarchy level, which is much more efficient for a user than a conventional faceted search. Other examples of facets that may not correspond directly to browse trees include, in embodiments, dates, places, type folding, non-canonical data types, combinations thereof, or otherwise as suitable. In some embodiments, the hybrid search-and-browse system 102 generates three levels of data for dates (e.g., year, month, day). In some cases, the hybrid search-and-browse system 102 may or may not generate facets from dates, or may instead only use dates as browse level information. Additionally, the hybrid search-and-browse system 102 may utilize places by generating multiple levels (or facets) in a browse hierarchy (e.g., country, province, city, etc.), where the places may only be available as a single facet in conventional search modalities. Having multiple levels within a browse hierarchy to discretize places and dates based on different levels of granularity advantageously improves the efficiency and reduces the navigational inputs for navigating through content items.

The hybrid search-and-browse system 102 can treat different types of content items differently. For a military service record, for example, the hybrid search-and-browse system 102 may fold regiment and company into a single facet for search but may preserve these data fields as two levels in browse, affording added granularity and control to client devices. In some cases, non-canonical fields like a tribe field in a Native American collection of records may not be available for faceted search because the hybrid search-and-browse system 102 indexes the tribe field as regular text. By contrast, including tribe within the browse hierarchy described herein facilitates filtering thereon within browse trees.

As mentioned above, the labeling and clustering approach for the database 302 as described above advantageously leverages an associated search functionality to reduce latency and achieve substantial economies on processing requirements. Further, this obviates the need to regenerate an entire browse structure in response to a single change in a single record.

As noted, in certain described embodiments, the hybrid search-and-browse system 102 generates and provides a hybrid search-and-browse interface. In particular, the hybrid search-and-browse system 102 generate and provides a hybrid search-and-browse interface that includes search functionality and browse functionality intelligently together for efficient navigation to desired data. FIG. 4 illustrates an example hybrid search-and-browse interface in accordance with one or more embodiments.

As illustrated in FIG. 4, a client device 400 displays a hybrid search-and-browse interface 402. Specifically, the client device 400 presents a search mode for the hybrid search-and-browse interface 402. Within the hybrid search-and-browse interface 402, the hybrid search-and-browse system 102 provides a search element 404 for entering text-based search queries and/or for selecting category elements for performing searches. As shown, the hybrid search-and-browse system 102 receives a search query to search for "Ohio, USA," as indicated by the category element 406. Accordingly, based on the category element 406, the hybrid search-and-browse system 102 generates search results and provides the search results for display within the search results pane 410. As shown, the hybrid search-and-browse system 102 identifies search results including a person "Jon" Jonathan Edward Hampton, an image for "Connor Cornelius," and others.

As shown, the hybrid search-and-browse interface 402 further includes a facet pane 408. Specifically, the hybrid search-and-browse interface 402 includes a facet pane 408 for selecting particular data facets associated with content items populated within the search results for the search query. Indeed, the hybrid search-and-browse system 102 can receive indications of user interactions selecting one or more facet-specific elements or options within the facet pane 408. In response to a selection, the hybrid search-and-browse system 102 modifies the search results pane 410 to present content items within a category defined or represented by the selected facet element. For example, if the hybrid search-and-browse system 102 receives a selection of the "World War I" option, the hybrid search-and-browse system 102 can populate the search results pane 410 with the 4.4 million search results that share the data facet(s) that defines the category of World War I content items. As shown, the hybrid search-and-browse system 102 can further separate and present the facet elements in separate facet sections (e.g., "Place," "Conflict/War," and "Title Collection") corresponding to a relationship, a shared concept, or a shared (broader) data facet between the content items within the categories defined by the individual facet elements.

As further illustrated in FIG. 4, the hybrid search-and-browse interface 402 includes a sort element 412. Based on a user interaction with the sort element 412, the hybrid search-and-browse system 102 the hybrid search-and-browse system 102 can define sorting (or filtering) criteria to apply to content items within a search result. As shown, the hybrid search-and-browse system 102 sorts the results within the search results pane 410 based on time, displaying results with "any time" facets or parameters. In some cases, the hybrid search-and-browse system 102 receives an indication of a user interaction to change the timing to sort (or filter out) content items according to time constraints (e.g., sorting most recent on top, or filtering out content items outside of a threshold recency).

As also illustrated in FIG. 4, the hybrid search-and-browse interface 402 includes a mode switch option 414. In particular, the mode switch option 414 is selectable to switch between a search mode and browse mode for the hybrid search-and-browse interface 402. While either mode can present content items for a search result, along with various interface elements such as the search element 404, the browse mode and the search mode provide separate viewing options and tools for exploring or navigating the search results.

As just mentioned, based on a selection of the mode switch option 414, the hybrid search-and-browse system 102 can switch from a search mode to a browse mode of the hybrid search-and-browse interface 402. In particular, the hybrid search-and-browse system 102 can provide browse-specific tools and interface elements together with search elements and search results for efficiently navigating to target content items. FIG. 5 illustrates an example browse mode for a hybrid search-and-browse interface in accordance with one or more embodiments.

As illustrated in FIG. 5, a client device 500 presents or displays a hybrid search-and-browse interface 502. Within the hybrid search-and-browse interface 502, the hybrid search-and-browse system 102 generates and provides a browse tree 506. More specifically, the hybrid search-and-browse system 102 generates the browse tree 506 to present the search results from the search results pane 410 of FIG. 4 in a different layout or format (e.g., for the browse mode as opposed to the search mode). Indeed, the hybrid search-and-browse system 102 generates the browse tree 506 to present the search results corresponding to the category element 504 that defines a search query. In some cases, the browse tree 506 includes category elements representing a plurality of sub-categories within the "Publications," where each sub-category corresponds to a respective data facet (or attribute) shared by the constituent additional categories/items nested inside (e.g., according to a facet tree).

As shown, in response to the search query of "Ohio, USA," the hybrid search-and-browse system 102 generates the browse tree 506 to represent a category of content items (e.g., "Publications" correspond to Ohio, USA). Indeed, the hybrid search-and-browse system 102 determines that there are 197 different sub-categories of content items within the category of the browse tree 506 (e.g., there are 197 different publications related to Ohio, USA). Additionally, the hybrid search-and-browse system 102 further arranges or organizes the browse tree 506 to present the sub-categories along with the numbers of content items (or additional sub-categories) are contained within each one. For example, the hybrid search-and-browse system 102 determines that there are fifteen different content items or categories within the category of "Australia WWI Service Records." Likewise, the hybrid search-and-browse system 102 determines and presents the numbers for other categories within the browse tree 506 as well.

As also shown, the browse tree 506 includes a filter element (represented by "Filter Publications"). The hybrid search-and-browse system 102 can receive input to enter a filter query for filtering the categories/content items populated within the browse tree 506. For example, the hybrid search-and-browse system 102 can receive a text input to filter or search among the enumerated categories or content items of the browse tree 506. In some cases, the hybrid search-and-browse system 102 can receive a selection or text entry of one or more facet-specific filter criteria by which to filter the categories/items of the browse tree 506.

Additionally, the hybrid search-and-browse interface 502 includes a mode switch element 508. Indeed, based on a selection of the mode switch element 508, the hybrid search-and-browse system 102 can switch the hybrid search-and-browse interface 502 back to the search mode. The search mode is discussed above in relation to FIG. 4.

Figure 6:
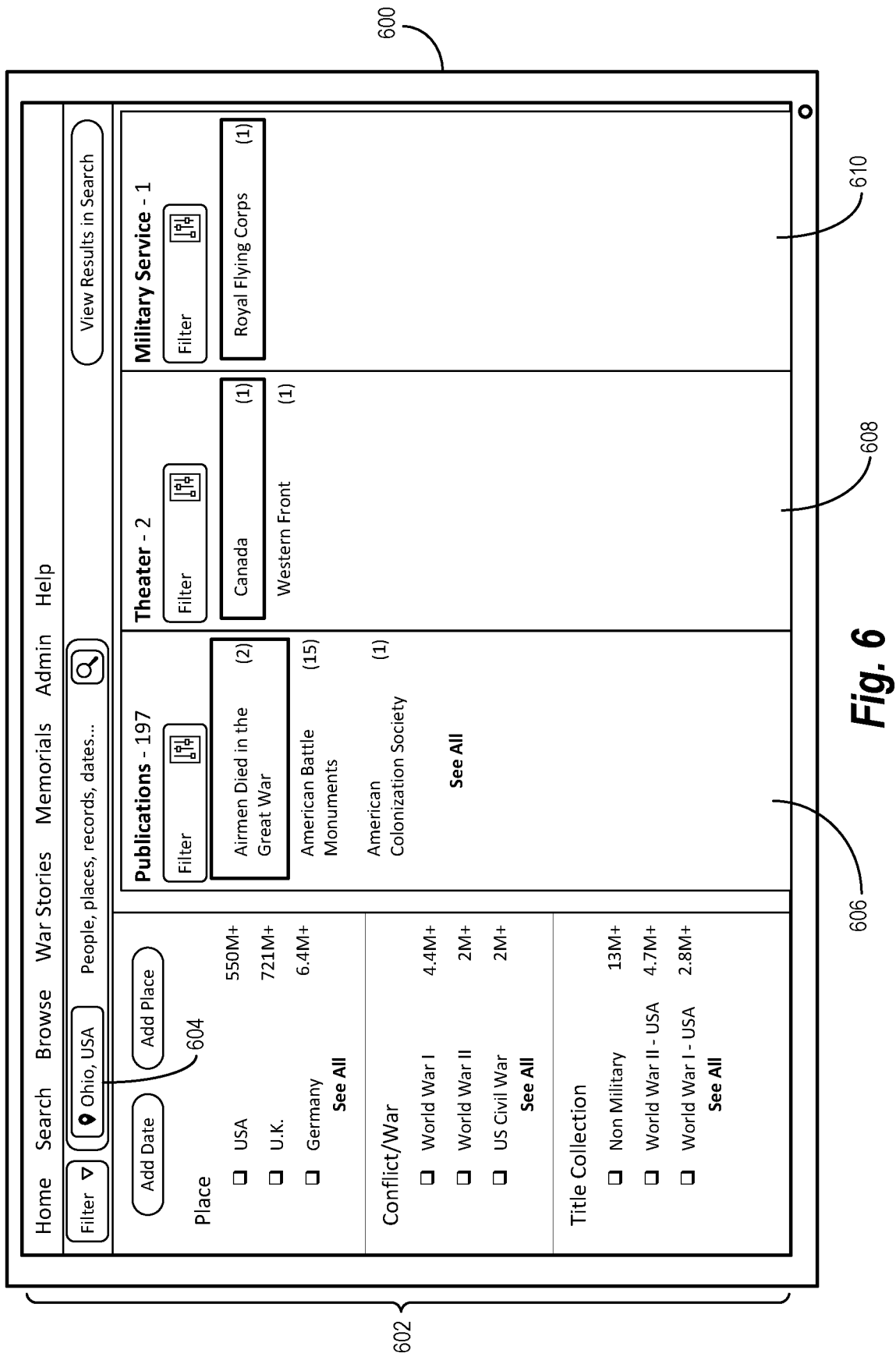
FIG. 6 illustrates an example hybrid search-and-browse interface including multiple browse trees in accordance with one or more embodiments.

As mentioned above, in certain described embodiments, the hybrid search-and-browse system 102 can generate and provide an additional browse tree based on selection of a category element within an initial browse tree. In particular, the hybrid search-and-browse system 102 can receive a selection of a category and can provide an additional browse tree that presents the sub-categories or items within the selected category, thus narrowing the search results from the initial browse tree. FIG. 6 illustrates a hybrid search-and-browse interface including multiple browse trees in accordance with one or more embodiments.

As illustrated in FIG. 6, a client device 600 presents or displays a hybrid search-and-browse interface 602 that includes multiple browse trees. To elaborate, the hybrid search-and-browse interface 602 includes or depicts a category element 604 representing a search query, as described. Indeed, the hybrid search-and-browse system 102 generates search results that include a plurality of content items. In addition, the hybrid search-and-browse system 102 organizes the search results into 197 different publications, as shown in the browse tree 606.

Further, the hybrid search-and-browse system 102 receives a selection of the first publication (e.g., the first sub-category of "Airmen Died in the Great War") within the browse tree 606, which includes two additional categories. As shown, in response to the selection, the hybrid search-and-browse system 102 generates and provides an additional browse tree 608. More particularly, the hybrid search-and-browse system 102 provides the additional browse tree 608 to present the sub-categories within the selected category from the browse tree 606. As shown, the hybrid search-and-browse system 102 generates the additional browse tree 608 to represent a facet or category of "Theater" (e.g., to indicate the two different war/battle theaters) within the selected category.

As further illustrated in FIG. 6, the hybrid search-and-browse system 102 generates and provides a further browse tree 610. More particularly, the hybrid search-and-browse system 102 provides the further browse tree 610 to drill further into a selected category of content items from the additional browse tree 608 (e.g., the "Canada" theater, which includes one content item). Indeed, based on a selection of the "Canada" category, the hybrid search-and-browse system 102 generates and provides the further browse tree 610 to present the content items within the selected category (e.g., as defined by a facet tree). As shown, the further browse tree 610 includes a single content item with a "Military Service" data facet (within the "Theater" category/facet which is within the "Publications category/facet) —the content item is titled "Royal Flying Corps" and its element is selectable within the further browse tree 610 to view or access the content item. The hybrid search-and-browse system 102 further indicates a number of categories/items within each browse tree of the hybrid search-and-browse interface 602, along with a filter element for filtering or searching the respective sets of categories/items.

As mentioned above, in certain described embodiments, the hybrid search-and-browse system 102 can generate and provide browse trees based on search results for a search query. In particular, the hybrid search-and-browse system 102 can generate and provide a search element menu for selecting data facets (or other search parameters) for entering a search query to define results for displaying in a browse tree. FIG. 7 illustrates an example search element menu for selecting data facets or other search parameters in accordance with one or more embodiments.

As illustrated in FIG. 7, a client device 700 presents or displays a hybrid search-and-browse interface 702. From the hybrid search-and-browse interface 702, the hybrid searchand-browse system 102 receives an indication of text input for a search query defined by one or more search terms. Specifically, the hybrid search-and-browse system 102 receives a selection of a first category element ("Conflict/War: US Civil War") and further receives additional text input for another search term. In some cases, the search terms may correspond directly to data facets in a facet tree.

As shown, the hybrid search-and-browse system 102 receives text input to enter the string "Army." In response to the text input, the hybrid search-and-browse system 102 analyzes a facet index (or a facet tree generated based on the already-entered category element) to identify additional content item categories or data facets that correspond to the string "Army." Specifically, the hybrid search-and-browse system 102 searches the facet index (or the database) to identify content item categories (e.g., sets of content items that share common attributes or facets) to populate within a search element menu 704 as the input is entered. Indeed, as each text character is input in the search element, the hybrid search-and-browse system 102 updates the search element menu 704 in real time (e.g., immediately after each input character) to present corresponding category elements.

In some embodiments, the hybrid search-and-browse system 102 identifies content item categories constrained by previously entered categories. To elaborate, the hybrid search-and-browse system 102 limits the search for the second (and subsequent) category elements to the set of content items corresponding to the first (or all preceding) category elements. For example, the hybrid search-and-browse system 102 identifies category elements corresponding to the "Army" string and also corresponding to (e.g., within) the "Conflict/War: US Civil War" category (or facet). Thus, the hybrid search-and-browse system 102 identifies content items and categories that are common to each of the categories for display within a browse tree. As shown, the hybrid search-and-browse system 102 populates the search element menu 704 with category elements, such as "Civil Ware Medal," "Army Medal of Honor (1945-2000)," and others. Each category element is selectable to view the content items (or sub-categories) therein within a browse tree.

As mentioned above, in certain embodiments, the hybrid search-and-browse system 102 generates and provides browse trees based on search results for a search query. In particular, the hybrid search-and-browse system 102 receives selections of category elements within a search element menu (and/or other manually entered search queries) and further populates results for an initial browse tree based on the search query. FIG. 8 illustrates an example browse tree presenting results for a multi-category (or multi-facet) search query in accordance with one or more embodiments.

As illustrated in FIG. 8, a client device 800 presents or displays a hybrid search-and-browse interface 802. In particular, the hybrid search-and-browse system 102 receives, via the hybrid search-and-browse interface 802, a search query that includes a first search block 804 and a second search block 806. Based on the search query, the hybrid search-and-browse system 102 searches a facet index to generate a facet tree that defines content items within various category-specific nodes corresponding to both the first search block 804 and the second search block 806. Indeed, the second search block 806 narrows the results of the first search block 804 such that the hybrid search-and-browse system 102 generates the browse tree 808 to include or depict categories of content items corresponding to (facets of) both the first search block 804 and the second search block 806.

Indeed, as shown in FIG. 8, the browse tree 808 displays a plurality of publications corresponding to both search categories of the search query. Within each publication, the browse tree 808 further indicates a number of sub-categories and/or content items included therein. For example, the browse tree 808 generates a browse tree category for "Pension Numerical Index" that includes 5.2 million content items (e.g., organized in additional sub-categories according to nodes of a facet tree), in addition to other browse tree categories. Each of the presented categories in the browse tree 808 includes content items corresponding to the first search block 804 and the second search block 806 and is selectable to generate an additional browse tree to further browse the sub-categories or content items within it.

Figure 9:
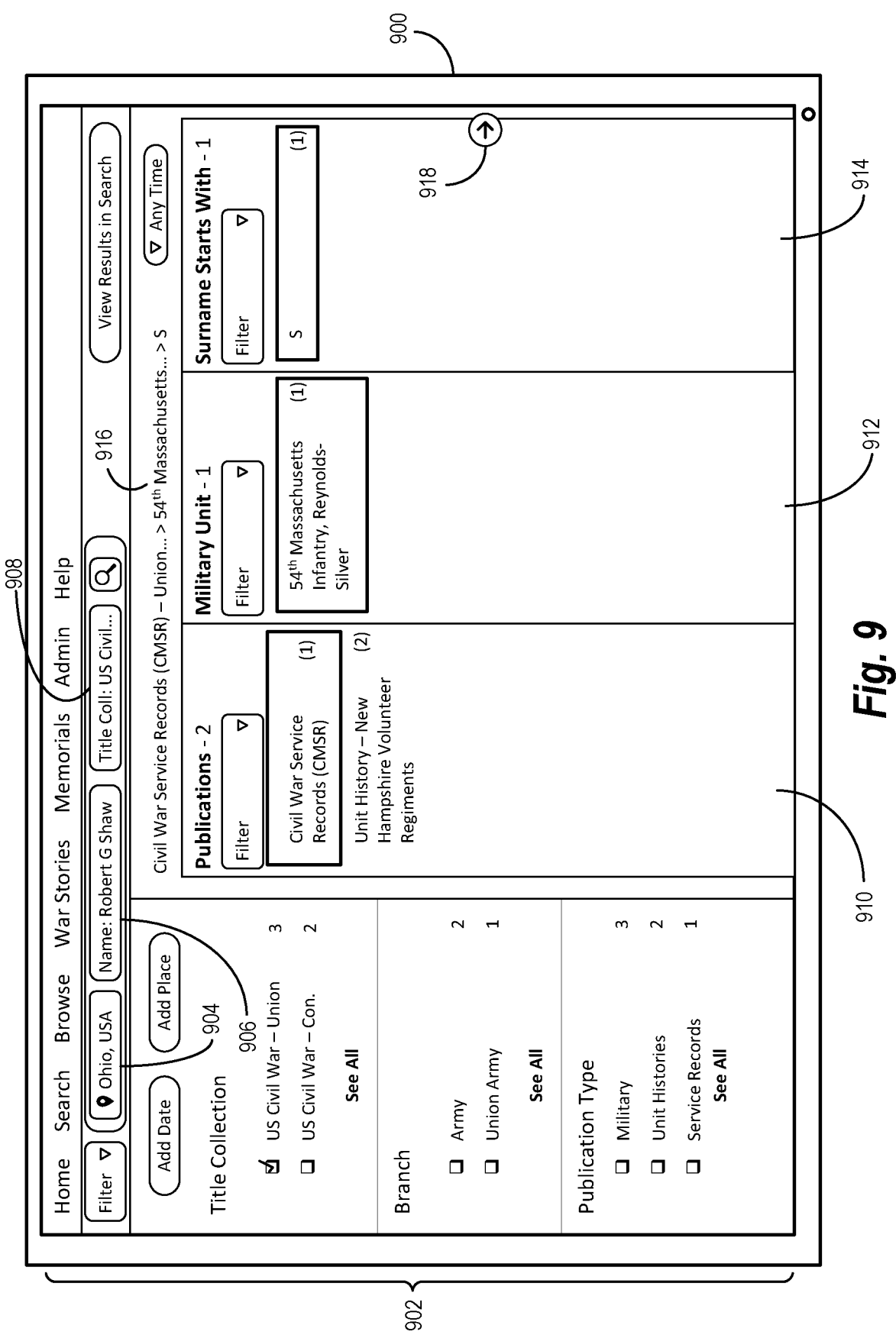
FIG. 9 illustrates a hybrid search-and-browse interface including multiple browse trees in accordance with one or more embodiments.

As just mentioned, the hybrid search-and-browse system 102 can generate additional browse trees based on selections of categories within an initial browse tree. In particular, the hybrid search-and-browse system 102 can generate a sequence of nested browse trees based on a sequence of interactions, where each browse tree in the chain or sequence narrows on the one that precedes it. FIG. 9 illustrates an example set of browse trees for efficiently narrowing search results in accordance with one or more embodiments.

As illustrated in FIG. 9, a client device 900 presents or depicts a hybrid search-and-browse interface 902. As shown in the hybrid search-and-browse interface 902, the hybrid search-and-browse system 102 receives a search query defined by three different search blocks. Accordingly, the hybrid search-and-browse system 102 analyzes a facet index and/or a database to identifies content items associated with the first search block 904, the second search block 906, and the third search block 908 (e.g., where each search block is selected from a search element menu or otherwise manually entered in the search element). From the identified content items, the hybrid search-and-browse system 102 generates an initial browse tree 910 that depicts a number of publications corresponding to the search query. As shown, the initial browse tree 910 includes two categories of publication.

As further shown, the hybrid search-and-browse system 102 receives an indication of a user interaction selecting the first category ("Civil War Service Records (CMSR)") within the initial browse tree 910. Based on the selection, the hybrid search-and-browse system 102 further generates an additional browse tree 912. For example, the hybrid search-and-browse system 102 generates the additional browse tree 912 to present content items under the selected category from the initial browse tree 910. As shown, the hybrid search-and-browse system 102 generates the additional browse tree 912 to include content items under the data facet of "Military Unit," which includes only a single unit.

In addition, the hybrid search-and-browse system 102 receives a selection of the browse tree category within the additional browse tree 912. Based on the selection, the hybrid search-and-browse system 102 generates a further browse tree 914 to narrow on the results of the additional browse tree 912 (which narrows on the results of the initial browse tree 910). Indeed, the hybrid search-and-browse system 102 generates the further browse tree 914 to include a category of content items based on the facet(s) of "Surname Starts With." As shown, the further browse tree 914 includes a single category for "S." Based on a selection of the "S" category, the hybrid search-and-browse system 102 generates yet another browse tree accessible by scrolling or panning within the hybrid search-and-browse interface 902 (e.g., by selecting the scroll option 918 which automatically appears based on detecting that more browse trees exist than are displayable in the hybrid search-and-browse interface 902 together).

As further illustrated in FIG. 9, the hybrid search-and-browse system 102 generates and provides a visual indication of a tree path 916. To elaborate, the hybrid search-and-browse system 102 determines the tree path 916 based on the browse trees of the hybrid search-and-browse interface 902. For instance, the hybrid search-and-browse system 102 determines a root of the tree path 916 (on the far left) corresponding to the (category selected within the) initial browse tree 910 and further determines each subsequent tree directory based on the (categories selected within the) subsequent browse trees. Accordingly, the tree path 916 indicates database locations where categories or content items within open browse trees are located. As shown, the tree path 916 indicates a path from "Civil War Service Records (CMSR) to S."

Additionally, as shown in FIG. 9, the hybrid search-and-browse system 102 updates the facet pane (e.g., the pane including "Title Collection," "Branch," and "Publication Type" left of the initial browse tree 910) based on search queries entered via a search element, and vice versa. As shown, the selectable facet options in the facet pane correspond to data facets and indicate numbers of categories or items within each category. Based on receiving a selection of a facet option in the facet pane, the hybrid search-and-browse system 102 generates and adds a search block in the search element. Indeed, as shown, the hybrid search-and-browse system 102 generates the third search block 908 based on the selection of the check box for the facet option "US Civil War—Union." In some cases, the reverse is also possible where the hybrid search-and-browse system 102 checks a box for a facet option in response to entry of a search term or selection of a particular option to create a search box in the search element.

The components of the hybrid search-and-browse system 102 can include software, hardware, or both. For example, the components of the hybrid search-and-browse system 102 can include one or more instructions stored on a computer-readable storage medium and executable by processors of one or more computing devices. When executed by one or more processors, the computer-executable instructions of the hybrid search-and-browse system 102 can cause a computing device to perform the methods described herein. Alternatively, the components of the hybrid search-and-browse system 102 can comprise hardware, such as a special purpose processing device to perform a certain function or group of functions. Additionally or alternatively, the components of the hybrid search-and-browse system 102 can include a combination of computer-executable instructions and hardware.

Furthermore, the components of the hybrid search-and-browse system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the hybrid search-and-browse system 102 may be implemented as part of a stand-alone application on a personal computing device or a mobile device.

FIGS. 1-9, the corresponding text, and the examples provide a number of different systems and methods for generating and providing a hybrid search-and-browse interface for navigating genealogical content items in a facet index. In addition to the foregoing, implementations can also be described in terms of flowcharts comprising acts steps in a method for accomplishing a particular result. For example, FIG. 10 illustrates an example series of acts for generating and providing a hybrid search-and-browse interface for navigating genealogical content items in a facet index in accordance with one or more embodiments.

Figure 10:
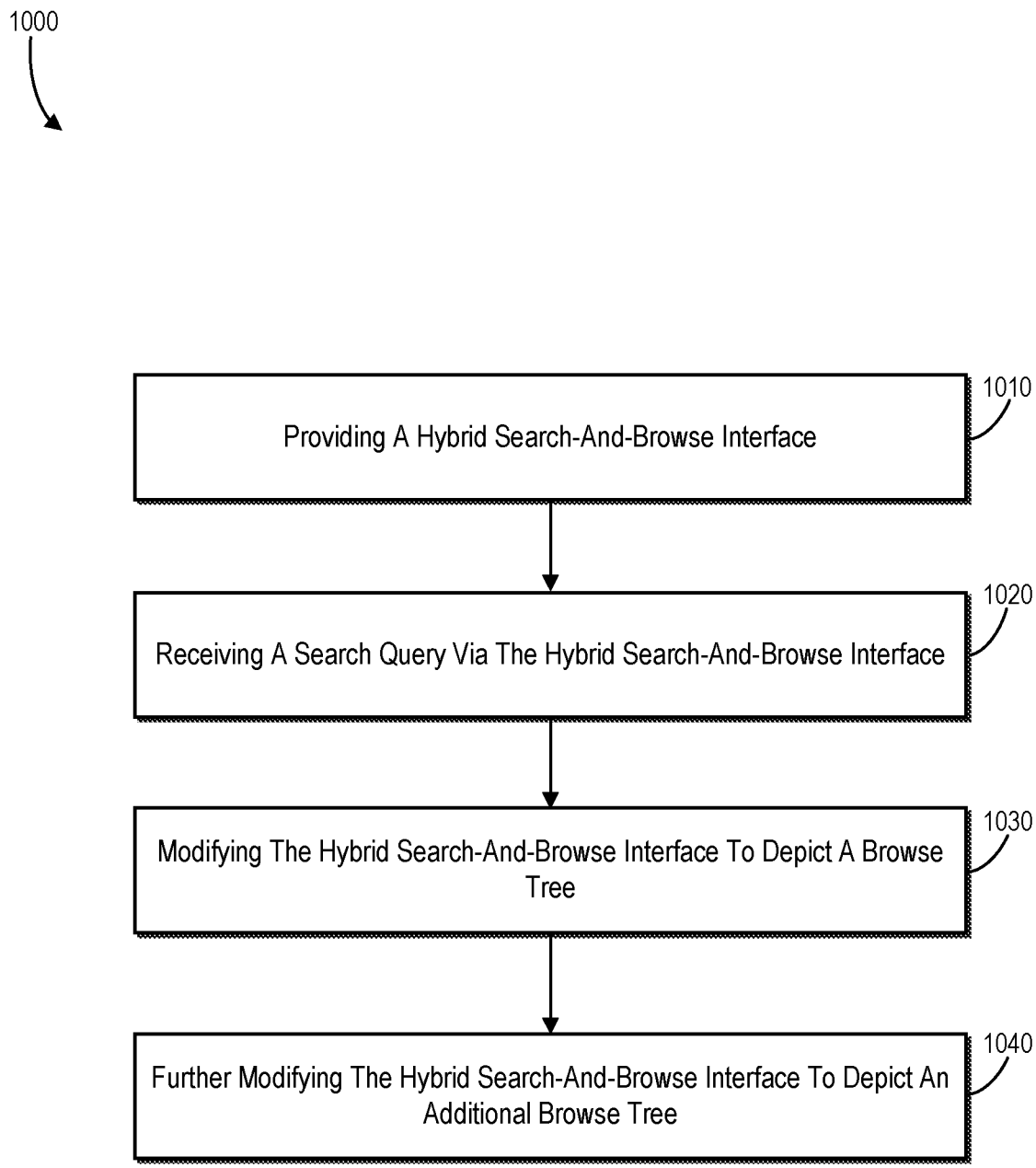
FIG. 10 illustrates a flowchart of a series of acts for generating and providing a hybrid search-and-browse interface in accordance with one or more embodiments.

While FIG. 10 illustrates acts according to certain implementations, alternative implementations may omit, add to, reorder, and/or modify any of the acts shown in FIG. 10. The acts of FIG. 10 can be performed as part of a method. Alternatively, a non-transitory computer-readable medium can comprise instructions, that when executed by one or more processors, cause a computing device to perform the acts of FIG. 10. In still further implementations, a system can perform the acts of FIG. 10.

As illustrated in FIG. 10, the series of acts 1000 includes acts 1010-1040. In particular the act 1010 includes providing a hybrid search-and-browse interface. Specifically, the act 1010 involves providing, for display on a client device, a hybrid search-and-browse interface comprising a search element for entering search queries and one or more browse trees corresponding to respective data facets associated with the search queries. Additionally, the act 1020 includes receiving a search query via the hybrid search-and-browse interface. Specifically, the act 1020 involves receiving, from the client device, an indication of a user interaction entering a search query within the search element to search a database for content items corresponding to the search query. The act 1030 includes modifying the hybrid search-and-browse interface to depict a browse tree. For example, the act 1030 involves, based on the search query, modifying the hybrid search-and-browse interface to present a browse tree depicting one or more categories of content items corresponding to a data facet defined by the search query. Further, the act 1040 includes further modifying the hybrid search-and-browse interface to depict an additional browse tree. For instance, the act 1040 involves, in response to user interaction selecting a category of content items within the browse tree, further modifying the hybrid search-and-browse interface to present an additional browse tree depicting additional categories of content items corresponding to an additional data facet of the category of content items.

In some embodiments, the series of acts 1000 includes an act of generating, from the database in response to the search query, a facet-specific category of content items corresponding to the search query. The series of acts 1000 can also include an act of providing, for display within a search element menu, a category element selectable to search based on the facet-specific category. Additionally, the series of acts 1000 can include an act of modifying the hybrid search-and-browse interface by: generating, from the search query, a plurality of search results organized in a hierarchical arrangement, wherein a first search result corresponding to the data facet defined by search query comprises a parent node and a second search result corresponding to the data facet comprises a child node; and adding the browse tree within the hybrid search-and-browse interface to present an interface element for the first search result within the hierarchical arrangement, wherein the interface element is selectable to display another browse tree that includes the second search result.

In certain embodiments, the series of acts 1000 includes an act of modifying the hybrid search-and-browse interface by providing, within the browse tree, visual indications of database locations of the content items corresponding to the data facet. Additionally, the series of acts 1000 can include an act of extracting, from a repository of content items, a plurality of data facets defining searchable parameters for identifying content items corresponding to search queries and an act of indexing the database according to the plurality of data facets.

In some cases, the series of acts 1000 includes an act of further modifying the hybrid search-and-browse interface by presenting the browse tree and the additional browse tree adjacent to one another in a sequence such that the additional browse tree is visually designated as a sub-tree of the browse tree. In some embodiments, the browse tree and the additional browse tree each include a filter bar for entering filter criteria to filter content items within respective browse trees.

The series of acts 1000 can include an act of generating, from the database in response to the search query, a facet-specific category of content items corresponding to the search query. Additionally, the series of acts 1000 can include an act of providing, for display within a search element menu, a category element selectable to search based on the facet-specific category. In some embodiments, the series of acts 1000 includes an act of generate the facet-specific category by: including, within the facet-specific category, content items corresponding to a stacked data facet for a previously entered search query; and excluding, from the facet-specific category, content items not corresponding to the stacked data facet for the previously entered search query.

In certain embodiments, the series of acts 1000 includes an act of detecting a new content item to add to the database. The series of acts 1000 can also include acts of updating a search index for the database to include a new facet identified for the new content item and, in response to the search query within the search element, generate, from the search index, a tree of content items arranged in a hierarchy of nodes belonging to the one or more categories for display within the browse tree. In some cases, the series of acts 1000 includes an act of further modifying the hybrid search-and-browse interface by providing, for display on the client device, a tree path indicating a progression of tree nodes traversed within the database to locate the additional categories of content items within the additional browse tree.

Additionally, the series of acts 1000 can include modifying the hybrid search-and-browse interface by: generating, from the search query, a plurality of search results organized in a hierarchical arrangement, wherein a first search result corresponding to the data facet defined by search query comprises a parent node and a second search result corresponding to the data facet comprises a child node; and adding the browse tree within the hybrid search-and-browse interface to present an interface element for the first search result within the hierarchical arrangement, wherein the interface element is selectable to display another browse tree that includes the second search result.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
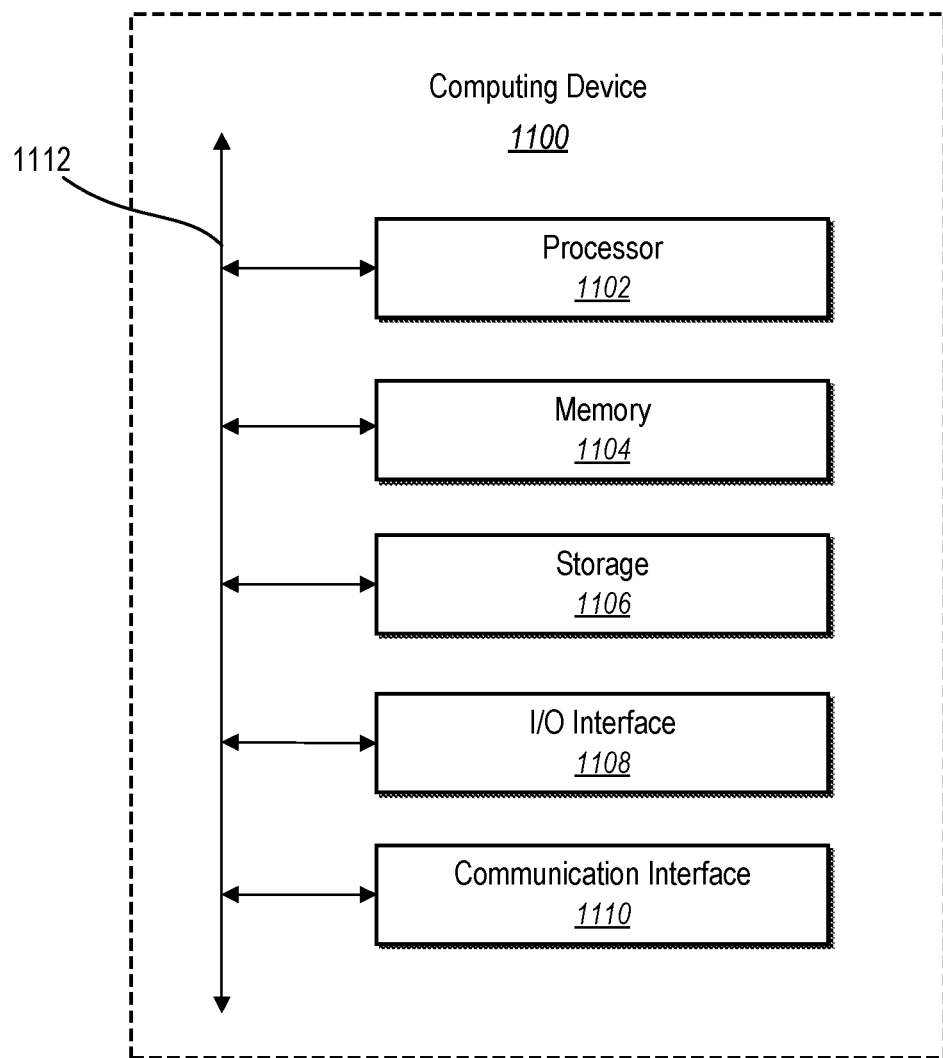
FIG. 11 illustrates a block diagram of an example computing device for implementing one or more embodiments of the present disclosure.

FIG. 11 illustrates a block diagram of exemplary computing device 1100 (e.g., the server(s) 104 and/or the client device 108) that may be configured to perform one or more of the processes described above. One will appreciate that server(s) 104 and/or the client device 108 may comprise one or more computing devices such as computing device 1100. As shown by FIG. 11, computing device 1100 can comprise processor 1102, memory 1104, storage device 1106, I/O interface 1108, and communication interface 1110, which may be communicatively coupled by way of communication infrastructure 1112. While an exemplary computing device 1100 is shown in FIG. 11, the components illustrated in FIG. 11 are not intended to be limiting. Additional or alternative components may be used in other implementations. Furthermore, in certain implementations, computing device 1100 can include fewer components than those shown in FIG. 11. Components of computing device 1100 shown in FIG. 11 will now be described in additional detail.

In particular implementations, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage device 1106 and decode and execute them. In particular implementations, processor 1102 may include one or more internal caches for data, instructions, or addresses. As an example and not by way of limitation, processor 1102 may include one or more instruction caches, one or more data caches, and one or more translation lookaside buffers (TLBs). Instructions in the instruction caches may be copies of instructions in memory 1104 or storage device 1106.

Memory 1104 may be used for storing data, metadata, and programs for execution by the processor(s). Memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1104 may be internal or distributed memory.

Storage device 1106 includes storage for storing data or instructions. As an example and not by way of limitation, storage device 1106 can comprise a non-transitory storage medium described above. Storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to computing device 1100. In particular implementations, storage device 1106 is non-volatile, solid-state memory. In other implementations, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to, receive output from, and otherwise transfer data to and receive data from computing device 1100. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1100 and one or more other computing devices or networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1112 may include hardware, software, or both that couples components of computing device 1100 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 12:
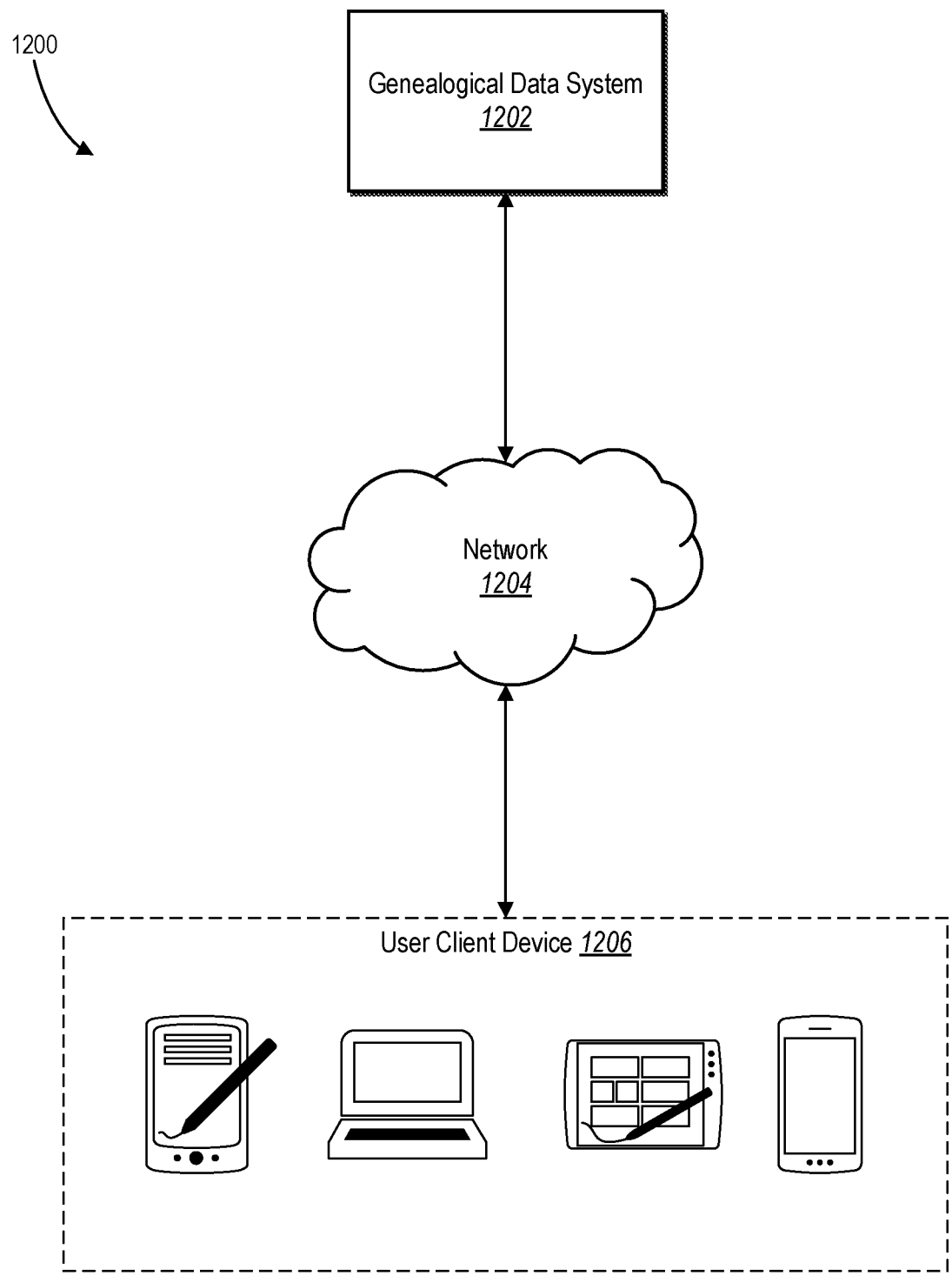
FIG. 12 illustrates a networking environment of a genealogical data system in accordance with one or more embodiments.

FIG. 12 is a schematic diagram illustrating environment 1200 within which one or more implementations of the hybrid search-and-browse system 102 can be implemented. For example, the hybrid search-and-browse system 102 may be part of a genealogical data system 1202 (e.g., the genealogical data system 106). The genealogical data system 1202 may generate, store, manage, receive, and send digital content (such as genealogical content items). For example, genealogical data system 1202 may send and receive digital content to and from client devices 1206 by way of network 1204. In particular, genealogical data system 1202 can store and manage genealogical databases for various user accounts, historical records, and genealogy trees. In some embodiments, the genealogical data system 1202 can manage the distribution and sharing of digital content between computing devices associated with user accounts. For instance, the genealogical data system 1202 can facilitate a user account sharing a genealogical content item with another user account of genealogical data system 1202.

In particular, the genealogical data system 1202 can manage synchronizing digital content across multiple client devices 1206 associated with one or more user accounts. For example, a user may edit a digitized historical document or a node within a genealogy tree using client device 1206. The genealogical data system 1202 can cause client device 1206 to send the edited genealogical content to the genealogical data system 1202, whereupon the genealogical data system 1202 synchronizes the genealogical content on one or more additional computing devices.

As shown, the client device 1206 may be a desktop computer, a laptop computer, a tablet computer, an augmented reality device, a virtual reality device, a personal digital assistant (PDA), an in- or out-of-car navigation system, a handheld device, a smart phone or other cellular or mobile phone, or a mobile gaming device, other mobile device, or other suitable computing devices. The client device 1206 may execute one or more client applications, such as a web browser (e.g., Microsoft Windows Internet Explorer, Mozilla Firefox, Apple Safari, Google Chrome, Opera, etc.) or a native or special-purpose client application (e.g., Ancestry: Family History & DNA for iPhone or iPad, Ancestry: Family History & DNA for Android, etc.), to access and view content over the network 1204.

The network 1204 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1206 may access genealogical data system 1202.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
providing, for display on a client device, a hybrid search-and-browse interface comprising a search element for entering search queries in a search mode;
generating, in response to a search query from the client device, a search result comprising content items corresponding to the search query arranged in a search layout according to the search mode of the hybrid search-and-browse interface;
generating cluster keys for the content items corresponding to the search query by hashing uniquely identifying data for the content items according to respective clusters for the content items;
detecting, from the client device, a selection of a mode switch element presented within the hybrid search-and-browse interface for switching from the search mode of the hybrid search-and-browse interface presenting search tools and the content items of the search result within in the search layout to a browse mode of the hybrid search-and-browse interface presenting browse tools and the content items of the search result within a browse layout, wherein the search layout and the browse layout present tools and content differently;
based on the selection of the mode switch element:
accessing a cluster hierarchy comprising the cluster keys for the content items corresponding to the search query; and
modifying, according to the cluster hierarchy, the hybrid search-and-browse interface by switching the hybrid search-and-browse interface from the search mode to the browse mode to rearrange the content items of the search result from the search layout to the browse layout comprising a first browse tree depicting category elements for one or more categories of content items corresponding to a first data facet defined by the search query; and
in response to a user interaction selecting a category element within the first browse tree, further modifying the hybrid search-and-browse interface to present a second browse tree depicting additional categories of content items corresponding to a second data facet defined by the category element selected by the user interaction.

2. The computer-implemented method of claim 1, further comprising:
generating, in response to the search query, a facet-specific category of content items corresponding to the search query; and
providing, for display within a search element menu, a category element selectable to search based on the facet-specific category.

3. The computer-implemented method of claim 1, wherein modifying the hybrid search-and-browse interface comprises:
generating, from the search query, a plurality of search results organized into nodes of a hierarchical data structure, wherein a first search result corresponding to the first data facet defined by the search query comprises a parent node in the hierarchical data structure and a second search result corresponding to the first data facet comprises a child node in the hierarchical data structure; and
upon switching from the search mode to the browse mode, adding the first browse tree to the hybrid search-and-browse interface to present browse content and browse tools corresponding to the parent node within the hierarchical data structure, wherein the category element is selectable to navigate the hierarchical data structure to display the second browse tree for the child node.

4. The computer-implemented method of claim 1, wherein modifying the hybrid search-and-browse interface comprises providing, within the first browse tree, visual indications of database locations of the content items corresponding to the first data facet.

5. The computer-implemented method of claim 1, further comprising:
extracting, from a repository of content items, a plurality of data facets defining searchable parameters for identifying content items corresponding to search queries; and
indexing a database according to the plurality of data facets.

6. The computer-implemented method of claim 1, wherein modifying the hybrid search-and-browse interface comprises, upon switching the hybrid search-and-browse interface from the search mode to the browse mode, presenting the first browse tree and the second browse tree adjacent to one another in a sequence such that the second browse tree is visually designated as a sub-tree of the first browse tree.

7. The computer-implemented method of claim 1, wherein the first browse tree and the second browse tree each include a filter bar for entering filter criteria to filter content items within the first browse tree and second browse tree.

8. A non-transitory computer readable medium storing instructions which, when executed by at least one processor, cause the at least one processor to:
provide, for display on a client device, a hybrid search-and-browse interface comprising a search element for entering search queries in a search mode;
generate, in response to a search query from the client device, a search result comprising content items corresponding to the search query arranged in a search layout according to the search mode of the hybrid search-and-browse interface;
generate cluster keys for the content items corresponding to the search query by hashing uniquely identifying data for the content items according to respective clusters for the content items;
detect, from the client device, a selection of a mode switch element presented within the hybrid search-and-browse interface for switching from the search mode of the hybrid search-and-browse interface presenting search tools and the content items of the search result within the search layout to a browse mode of the hybrid search-and-browse interface presenting browse tools and the content items of the search result within a browse layout, wherein the search layout and the browse layout present tools and content differently;
based on the selection of the mode switch element:
access a cluster hierarchy comprising the cluster keys for the content items corresponding to the search query; and modify, according to the cluster hierarchy, the hybrid search-and-browse interface by switching the hybrid search-and-browse interface from the search mode to the browse mode to rearrange the content items of the search result from the search layout to the browse layout comprising a first browse tree depicting category elements for one or more categories of content items corresponding to a first data facet defined by the search query; and in response to a user interaction selecting a category element within the first browse tree, further modify the hybrid search-and-browse interface to present, together with the first browse tree, a second browse tree depicting additional categories of content items corresponding to a second data facet defined by the category element selected by the user interaction.

9. The non-transitory computer readable medium of claim 8, further storing instructions which, when executed by the at least one processor, cause the at least one processor to:
generate, in response to the search query, a facet-specific category of content items corresponding to the search query; and
provide, for display within a search element menu, a category element selectable to search based on the facet-specific category.

10. The non-transitory computer readable medium of claim 9, further storing instructions which, when executed by the at least one processor, cause the at least one processor to generate the facet-specific category by:
including, within the facet-specific category, content items corresponding to a stacked data facet for a previously entered search query; and
excluding, from the facet-specific category, content items not corresponding to the stacked data facet for the previously entered search query.

11. The non-transitory computer readable medium of claim 8, further storing instructions which, when executed by the at least one processor, cause the at least one processor to:
detect a new content item to add to a database storing the content items;
update a search index for the database to include a new facet identified for the new content item; and
in response to the search query within the search element, generate, from the search index, a tree of content items arranged in a hierarchy of nodes belonging to the one or more categories for display within the first browse tree.

12. The non-transitory computer readable medium of claim 8, further storing instructions which, when executed by the at least one processor, cause the at least one processor to further modify the hybrid search-and-browse interface by providing, for display on the client device, a tree path indicating a progression of tree nodes traversed within a database to locate the additional categories of content items within the second browse tree.

13. The non-transitory computer readable medium of claim 8, further storing instructions which, when executed by the at least one processor, cause the at least one processor to modify the hybrid search-and-browse interface by:
generating, from the search query, a plurality of search results organized into nodes of a hierarchical data structure, wherein a first search result corresponding to the first data facet defined by the search query comprises a parent node in the hierarchical data structure and a second search result corresponding to the first data facet comprises a child node in the hierarchical data structure; and
upon switching from the search mode to the browse mode, adding the first browse tree to the hybrid search-and-browse interface to present browse content and browse tools corresponding to the parent node within the hierarchical data structure, wherein the category element is selectable to navigate the hierarchical data structure to display the second browse tree for the child node.

14. The non-transitory computer readable medium of claim 8, wherein further modifying the hybrid search-and-browse interface comprises presenting the first browse tree and the second browse tree adjacent to one another in a sequence such that the second browse tree is visually designated as a sub-tree of the first browse tree.

15. A system comprising:
one or more memory devices; and
one or more processors coupled to the one or more memory devices, wherein the one or more processors are configured to cause the system to:
provide, for display on a client device, a hybrid search-and-browse interface comprising a search element for entering search queries in a search mode;
generate, in response to a search query from the client device, for a search result comprising content items corresponding to the search query arranged in a search layout according to the search mode of the hybrid search-and-browse interface;
generate cluster keys for the content items corresponding to the search query by hashing uniquely identifying data for the content items according to respective clusters for the content items;
detect, from the client device, a selection of a mode switch element presented within the hybrid search-and-browse interface for switching from the search mode of the hybrid search-and-browse interface presenting search tools and the content items of the search result within the search layout to a browse mode of the hybrid search-and-browse interface presenting browse tools and the content items of the search result within a browse layout, wherein the search layout and the browse layout present tools and content differently;
based on the selection of the mode switch element:
access a cluster hierarchy comprising the cluster keys for the content items corresponding to the search query; and
modify, according to the cluster hierarchy, the hybrid search-and-browse interface by switching the hybrid search-and-browse interface from the search mode to the browse mode to rearrange the content items of the search result from the search layout to the browse layout comprising a first browse tree depicting category elements for one or more categories of content items corresponding to a first data facet defined by the search query; and
in response to a user interaction selecting a category element within the first browse tree, further modify the hybrid search-and-browse interface to present, together with the first browse tree, a second browse tree depicting content items corresponding to a second data facet defined by the category element selected by the user interaction.

16. The system of claim 15, wherein the one or more processors are further configured to cause the system to:

generate, in response to the search query, a facet-specific category of content items corresponding to the search query; and provide, for display within a search element menu, a category element selectable to search based on the facet-specific category.

17. The system of claim 15, wherein the one or more processors are further configured to cause the system to modify the hybrid search-and-browse interface by:

generating, from the search query, a plurality of search results organized into nodes of a hierarchical data structure, wherein a first search result corresponding to the first data facet defined by search query comprises a parent node in the hierarchical data structure and a second search result corresponding to the first data facet comprises a child node in the hierarchical data structure; and upon switching from the search mode to the browse mode, adding the first browse tree to the hybrid search-and-browse interface to present browse content and browse tools corresponding to the parent node within the hierarchical data structure, wherein the category element is selectable to navigate the hierarchical data structure to display the second browse tree for the child node.

18. The system of claim 15, wherein the one or more processors are further configured to cause the system to modify the hybrid search-and-browse interface by providing, within the first browse tree, visual indications of database locations of the content items corresponding to the first data facet.

19. The system of claim 15, wherein the one or more processors are further configured to cause the system to:

extract, from a repository of content items, a plurality of data facets defining searchable parameters for identifying content items corresponding to search queries; and index a database according to the plurality of data facets.

20. The system of claim 15, wherein the one or more processors are further configured to cause the system to modify the hybrid search-and-browse interface by presenting the first browse tree and the second browse tree adjacent to one another in a sequence such that the second browse tree is visually designated as a sub-tree of the first browse tree.

* * * * *